(12) United States Patent
Bucher et al.

(10) Patent No.: US 8,337,162 B2
(45) Date of Patent: *Dec. 25, 2012

(54) QUICK INSTALL BLADE ARMS FOR CEILING FANS

(75) Inventors: Charles E. Bucher, Venetia, PA (US); John C. Bucher, Hillsboro Beach, FL (US)

(73) Assignee: Chien Luen Industries Co., Ltd., Inc., Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,664

(22) Filed: Aug. 11, 2010

(65) Prior Publication Data

US 2011/0033301 A1 Feb. 10, 2011

Related U.S. Application Data

(60) Division of application No. 12/148,399, filed on Apr. 18, 2008, now Pat. No. 7,857,592, which is a division of application No. 11/010,210, filed on Dec. 10, 2004, now Pat. No. 7,396,210, which is a division of application No. 09/924,876, filed on Aug. 8, 2001, now Pat. No. 6,872,053, which is a division of application No. 09/405,676, filed on Sep. 24, 1999, now Pat. No. 6,352,411, which is a continuation-in-part of application No. 09/200,607, filed on Nov. 30, 1998, now Pat. No. 6,171,059, which is a division of application No. 08/851,501, filed on May 5, 1997, now Pat. No. 6,010,306.

(51) Int. Cl.
*F04D 29/34* (2006.01)

(52) U.S. Cl. ............... 416/210 R; 416/5; 416/134 R; 416/204 R; 416/205; 416/206; 416/221; 403/302; 403/326; 403/329

(58) Field of Classification Search .......... 416/5, 134 R, 416/204 R, 205, 206, 207, 210 R, 220 A, 416/221; 403/302, 326, 329; 24/295, 297, 24/694, 697.1; 411/84, 85, 508, 509, 913; 29/889, 889.1, 889.3

See application file for complete search history.

(56) References Cited

U.S. PATENT DOCUMENTS 587,245 A 7/1897 Stellner
(Continued)

FOREIGN PATENT DOCUMENTS

GB 2276219 9/1994
(Continued)

*Primary Examiner* — Christopher Verdier
(74) *Attorney, Agent, or Firm* — Brian S. Steinberger; Law Offices of Brian S. Steinberger, P.A.

(57) ABSTRACT

Quick attachable and detachable mounting arms for ceiling fans. A first version has flat headed fasteners initially attached to one end of mounting arms, with key-hole slots in the endshield of the ceiling fan motor. The user raises the mounting arm so that the flat headed fasteners fits through the larger openings in the keyhole slots and then pulls the mounting arm outward until the arm locks in place by the smaller opening portions of the keyhole slots. Rubber type gaskets and washers help lock and hold the mounting arms in place. The flat headed fasteners can also be located on the endshields with the keyhole slots on mounting arms. A second embodiment includes inwardly deformable springably snapable fasteners that can be located on the ends of the mounting arms which can deform inwardly and expand after passing through slots on the endshield of the rotor. Alternatively, the fasteners can be located on the bottom of the endshield with the receiving slots on the ends of the mounting arms. The different versions can include guide posts for allowing only one single fastener to be needed. A third embodiment allows the inwardly bendable snapable fasteners to be removable with screws.

6 Claims, 7 Drawing Sheets

U.S. PATENT DOCUMENTS

| | | | |
|---|---|---|---|
| 1,804,831 A | | 5/1931 | Hardesty |
| 2,595,829 A | * | 5/1952 | Dean .......................... 416/221 |
| 2,610,377 A | | 9/1952 | Bedford |
| 2,771,259 A | | 11/1956 | Laystrom |
| 2,965,180 A | | 12/1960 | Killam |
| 3,392,848 A | | 7/1968 | McConnell |
| 3,572,970 A | * | 3/1971 | Smuland ....................... 416/221 |
| 4,050,771 A | | 9/1977 | Watson |
| 4,121,495 A | | 10/1978 | Malo |
| 4,140,435 A | * | 2/1979 | Huber .......................... 416/206 |
| 4,225,265 A | | 9/1980 | Hooker |
| 4,313,297 A | | 2/1982 | Maier |
| 4,511,510 A | | 4/1985 | Mauri |
| 4,884,947 A | | 12/1989 | Rezek |
| 5,108,260 A | | 4/1992 | Monrose |
| 5,135,341 A | | 8/1992 | Leyder |
| 5,180,284 A | | 1/1993 | Monrose |
| 5,372,480 A | | 12/1994 | Van Meter |
| 5,384,940 A | | 1/1995 | Soule |
| 5,397,206 A | | 3/1995 | Sihon |
| 5,462,412 A | | 10/1995 | Scofield |
| 5,501,010 A | | 3/1996 | Scott |
| 5,593,283 A | | 1/1997 | Scott |
| 5,599,512 A | | 2/1997 | Latulippe |
| 5,653,349 A | | 8/1997 | Dana |
| 5,873,701 A | | 2/1999 | Shiu |
| 5,927,945 A | | 7/1999 | Chen |
| 5,944,486 A | | 8/1999 | Hodgkins |
| 5,944,487 A | | 8/1999 | Pearce |
| 5,951,197 A | | 9/1999 | Wu |
| 5,954,449 A | | 9/1999 | Wu |
| 5,980,353 A | | 11/1999 | Wu |
| 6,010,306 A | | 1/2000 | Bucher |
| 6,027,309 A | | 2/2000 | Rawls |
| 6,027,310 A | | 2/2000 | Kerr |
| 6,039,540 A | | 3/2000 | Wu |
| 6,042,339 A | * | 3/2000 | Blateri et al. ................. 416/207 |
| 6,048,173 A | | 4/2000 | Chen |
| 6,059,531 A | | 5/2000 | Tai |
| 6,095,753 A | | 8/2000 | Hsu |
| 6,139,276 A | | 10/2000 | Blateri |
| 6,149,388 A | | 11/2000 | Liao |
| 6,155,786 A | | 12/2000 | Blateri |
| 6,171,059 B1 | | 1/2001 | Bucher |
| 6,210,117 B1 | | 4/2001 | Bucher |
| 6,241,475 B1 | | 6/2001 | Blateri |
| 6,261,064 B1 | | 7/2001 | Tang |
| 6,309,183 B1 | | 10/2001 | Bucher |
| 6,336,792 B1 | | 1/2002 | Bucher |
| 6,352,411 B1 | | 3/2002 | Bucher |
| 6,382,918 B1 | | 5/2002 | Tang |
| 6,872,053 B2 | | 3/2005 | Bucher |
| 7,396,210 B2 | | 7/2008 | Bucher |

FOREIGN PATENT DOCUMENTS

JP     3-272308     12/1991

\* cited by examiner

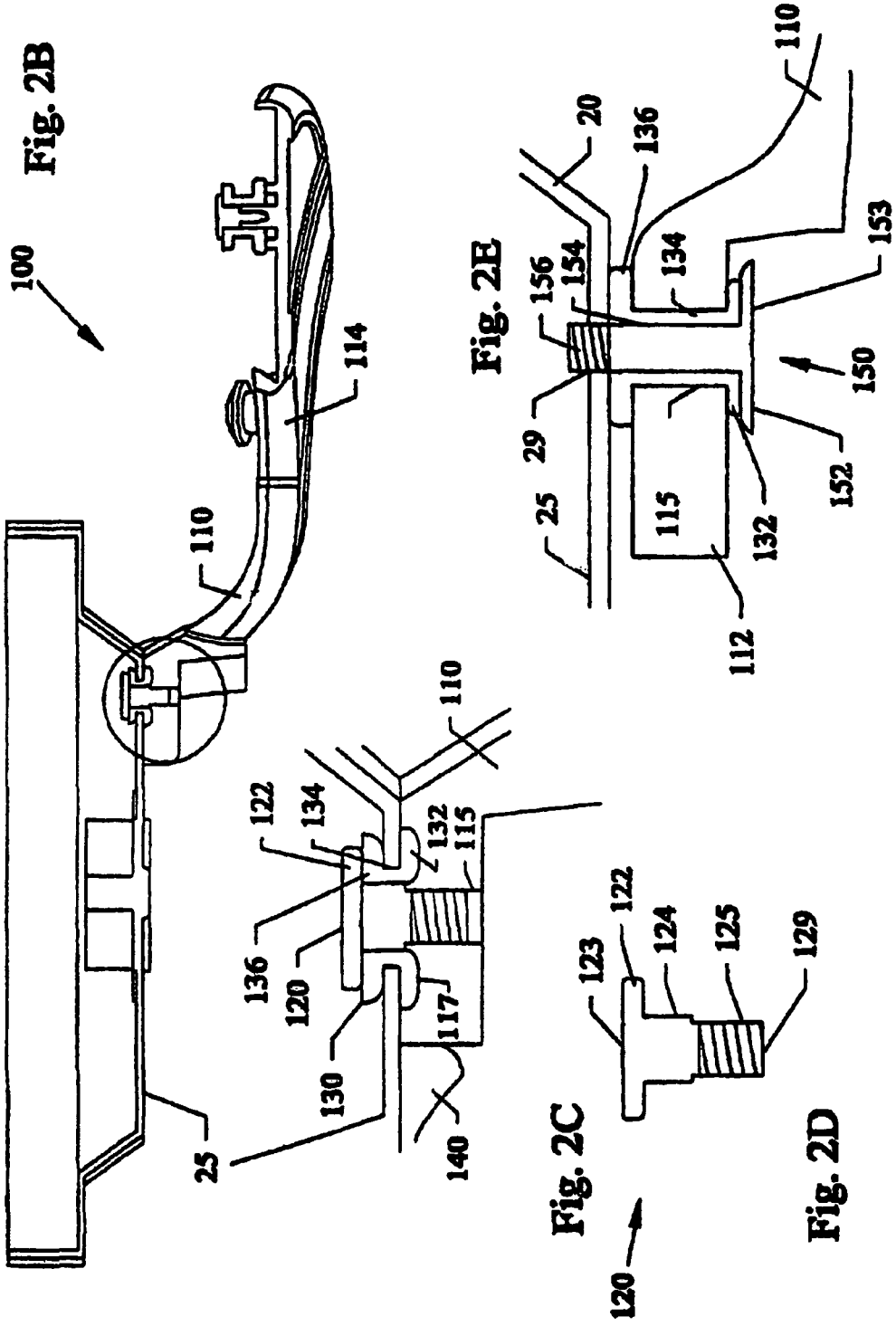

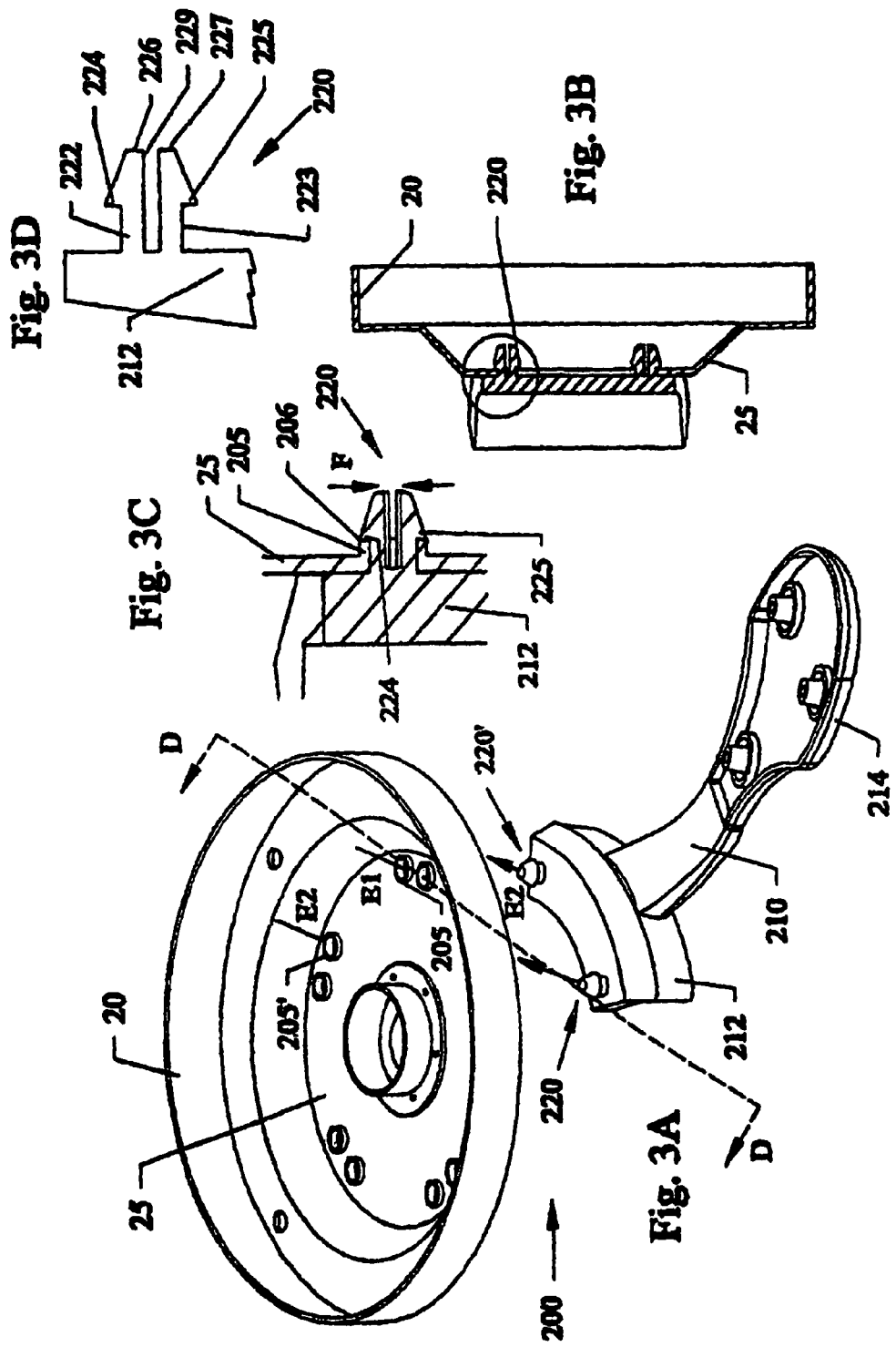

QUICK INSTALL BLADE ARMS FOR CEILING FANS

This invention is a Divisional Application of U.S. application Ser. No. 12/148,399 filed Apr. 18, 2008, now U.S. Pat. No. 7,857,592, which is a Divisional Application of U.S. application Ser. No. 11/010,210 filed Dec. 10, 2004, now U.S. Pat. No. 7,396,210, which is a Divisional Application of U.S. application Ser. No. 09/924,876 filed Aug. 8, 2001, now U.S. Pat. No. 6,872,053, which is a Divisional Application of U.S. application Ser. No. 09/405,676 filed Sep. 24, 1999 now U.S. Pat. No. 6,352,411, which is a Continuation-In-Part of U.S. application Ser. No. 09/200,607 filed Nov. 30, 1998, now U.S. Pat. No. 6,171,059, which is a Divisional Application of U.S. application Ser. No. 08/851,501 filed on May 5, 1997, now U.S. Pat. No. 6,010,306.

FIELD OF INVENTION

This invention relates to ceiling fans, and in particular to easy and quick to attached and detach blade arms for overhead ceiling fans.

BACKGROUND AND PRIOR ART

Most conventional ceiling fans are similarly installed. FIG. 1 shows a partial side view of a conventional ceiling fan unit 1 that encompasses a general prior art ceiling fan system. In FIG. 1, ceiling fan motor 10 has rotor component 20 that rotates about a central axis beneath motor 10, which is in turn connected to a housing 5 that is attached beneath a ceiling 2. A plurality of fan blades 30 are connected to the rotor 20 by mounting arms 40. Each mounting arm 40 has one end 42 connected to an end 32 of each fan blade 30, and a second end 44 having at least two through-holes 45 therethrough, so that conventional fasteners such as screws 50 pass through the through-holes 45 to mateably thread into threaded holes 25 in the bottom of rotor 20.

Usually most conventional directions have the installer first connect and hang the motor 10, rotor 20 and housing 5 to a ceiling. More often than not the installer is usually perched on a stool or ladder. Next, many directions have the installer attach the fan blades 30 to their respective mounting arms 40. Finally, one of the last steps is to connect the blade 30 and respective mounting arm 40 to the rotor 20 on the motor.

To finish this final assembly step takes great dexterity, patience, balance and time. In order for a single person 60 to be able to complete this final step, the installer 60 needs to hold in one hand 62 the fan blade 30 and already attached mounting arm 40, and to position a screw driver 70 to the heads of screws 50 with the other hand 64. The installer must be able to balance the mounting screws 50 on the tip of the screw driver 70, insert the screws upwardly though the holes 45 in the mounting arm, making sure not to accidentally drop the screws 50 and then screw the screws 50 into the mating holes 25 on the rotor 20 all while still holding the blade 30 and arm 40. This assembly requires the installer to have to constantly hold both hands 62 and 64 raised high above their head while again standing on a stool or on a ladder.

Many problems occur from this traditional method of having one person installing a ceiling fan. Screws 50 can and do accidentally fall and become lost causing more time and more expense to finish the installation. The installer 60 often has to constantly re position the blade 30 and arm 40 in order to be able to properly line up the through-holes 45 in the mounting arms 40 with their respective mating holes 25 in the bottom of rotor 20. The blade 30 and mounting arm 40 have been known to fall on and cause injury to the user 60 during assembly. Additionally, the user can lose their balance and injure themselves as well as falling off the ladder and stool. Additional problems also occur after installation. For example, uneven tightening of each of the plural fasteners that connect the mounting arm to the motor has resulted in wobble effects when the ceiling fan system is running. Thus, the current operation of assembly has become known as a frustrating, undesirable, difficult, tedious, time consuming and sometimes dangerous task.

To merely add a second worker to help in the assembly installation may solve some of the problems above, but would add additional cost and labor expense to the installation project.

In addition to the difficulty of having to screw the blade arms onto the ceiling fan motor endshield, the endshield contains unsightly screw heads that detract from the appearance of the ceiling fan itself. Another problem with using screw type fasteners is that the fasteners themselves can loosen causing the blade arms and connected blades to accidentally fall resulting in damages to surrounding property and people beneath the ceiling fans.

Additionally, ceiling fan blades and their blade arm supports need to be cleaned to remove dirt and dust buildup. Existing fan blades and blade arms are hard to remove from the ceiling mounted motors. Thus, fan blades and their respective blade arms are left mounted on the ceiling mounted motors. Current techniques have relied on manually holding brushes directly to the ceiling mounted blades and blade arms which inherently tires the muscles in the cleaner's neck, shoulders, arms and hands. This messy cleaning with brushes causes the dirt to fall on both the cleaner and furniture and flooring beneath the fan.

SUMMARY OF THE INVENTION

The first objective of the present invention is to provide detachable blade arms for ceiling fans that are easy and quick to install.

The second objective of the present invention is to provide detachable blade arms for ceiling fans that allow each blade arm to be locked in place to the motor housing.

The third objective of the present invention is to provide detachable blade arms for ceiling fans wherein the centrifugal force of the fans locks the blades in place.

The fourth objective of the present invention is to allow a single user to safely and easily attach and detach a fan blade mounting arm to a ceiling mounted fan motor.

The fifth object of this invention is to provide a detachable blade mounting arm for a ceiling fan motor that does not use fasteners such as screws.

The sixth object of this invention is to provide inwardly deformable and bendable fasteners that snapably expand locking the blade mounting arms to ceiling fan motors.

The seventh object of this invention is to provide guide posts for allowing the mounting arm to be guided onto its' attachment points on the ceiling fan motor.

A first preferred embodiment of the novel invention device for attaching ceiling fan mounting arms to ceiling fan motors includes a ceiling fan motor having a rotating member, a mounting arm having a first end connected to a fan blade and a second end, and a slide and lock means for connecting the second end of the mounting arm to the rotating member, wherein the slide and lock means allows the mounting arm to slide onto and lock with the rotating member. The slide and lock means can be one, two, three or more protruding members with respective slots that can be shaped like a keyhole.

Each protruding member can be located on the second end of the mounting arm with the slot located on the rotating member. Alternatively, the protruding member can be located on the rotating member with the slot located on the mounting arm. A deformable means such as a rubber gasket can also be used between the mounting arm and the rotating member for creating vibration isolation and enhanced fit between these parts. Additionally, a spring means such as a spring clip can be used for locking the arm to the rotating member. The blade arms can be made of materials such as but not limited to plastic, wood, and the like. The blade arms can be separate from the actual blades or be formed from one piece.

A second embodiment of the invention includes a quick snap installed blade arm for ceiling fans that includes a ceiling fan motor having a rotating member, a blade mounting arm having a connecting end connected to the rotating member, and a bendable snap fastener for attaching the connecting end of the mounting arm to the rotating member wherein the snap fastener allows the mounting arm to snap onto and lock with the rotating member. The snap fastener can include inwardly bendable hook ends above a shaft and a slot for receiving the inwardly bendable hook ends and allowing the hook ends to expand after passing therethrough. The inwardly bendable hook ends can be located on the mounting arm with the slot located on the rotating member. Alternatively, the inwardly bendable hook ends can be located on the rotating member with the slot located on the mounting arm. Alignment guide post(s) with receiving slot(s) can be used so that only one fastener needs to be used.

The third embodiment of the invention is a removable quick snap installable blade arm for ceiling fans that includes a ceiling fan motor having a rotating member, a blade mounting arm having a connecting end connected to the rotating member, and a bendable snap fastener for attaching and detaching the connecting end of the mounting arm to the rotating member, wherein the snap fastener allows the mounting arm to snap onto and lock with the rotating member, and be removed from the rotating member. The snap fastener can include bendable hook ends above a shaft and a slot for receiving the inwardly deformable hook end and allowing the hook end to expand after passing therethrough. The inwardly deformable hook end can be located on the mounting arm with the slot located on the rotating member. Alternatively, the inwardly deformable hook ends can be located on the rotating member with the slot located on the mounting arm. A screwable fastener can attach the deformable hook ends in place. A deformable means such as a rubber gasket can be located between the snap means and the rotating member for vibration isolation and enhanced fit between the components.

When assembling the embodiments, the ceiling fan motor housing and rotating member (endshield) can usually first be hung from a ceiling. Next the installer can simply hold the pre-connected mounting arm and fan blade with one hand and guide the mounting arm until the tip portion of the fasteners enters into the mateable slot openings.

Further objects and advantages of this invention will be apparent from the following detailed description of a presently preferred embodiment which is illustrated schematically in the accompanying drawings.

BRIEF DESCRIPTION OF THE FIGURES

FIG. 2B is a side cross-sectional view of an assembled slide and lock fastener and associated components of FIG. 2A along arrow A after being assembled and detached.

FIG. 2C is an enlarged view of the slide and lock fastener of FIG. 2B with the protruding member on the blade arm and the slot on the rotor.

FIG. 2D is a view of the flat-headed fastener screw of FIG. 2C.

FIG. 2E is an enlarged view of the slide and lock fastener of FIG. 2C with the protruding member on the rotor and the slot in the mounting arm.

FIG. 3A is an exploded view of a second embodiment of a quick install snapable mounting arm for attaching to the rotor of a ceiling fan.

FIG. 3B is a side cross-sectional view of the mounting arm and rotor of FIG. 3A being attached together along arrow D.

FIG. 3C is an enlarged view of the inwardly deformable snap fastener and rotor of FIG. 3B.

FIG. 3D is an enlarged view of the inwardly deformable snap fastener of FIG. 3C.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Embodiment

Figure 2A:
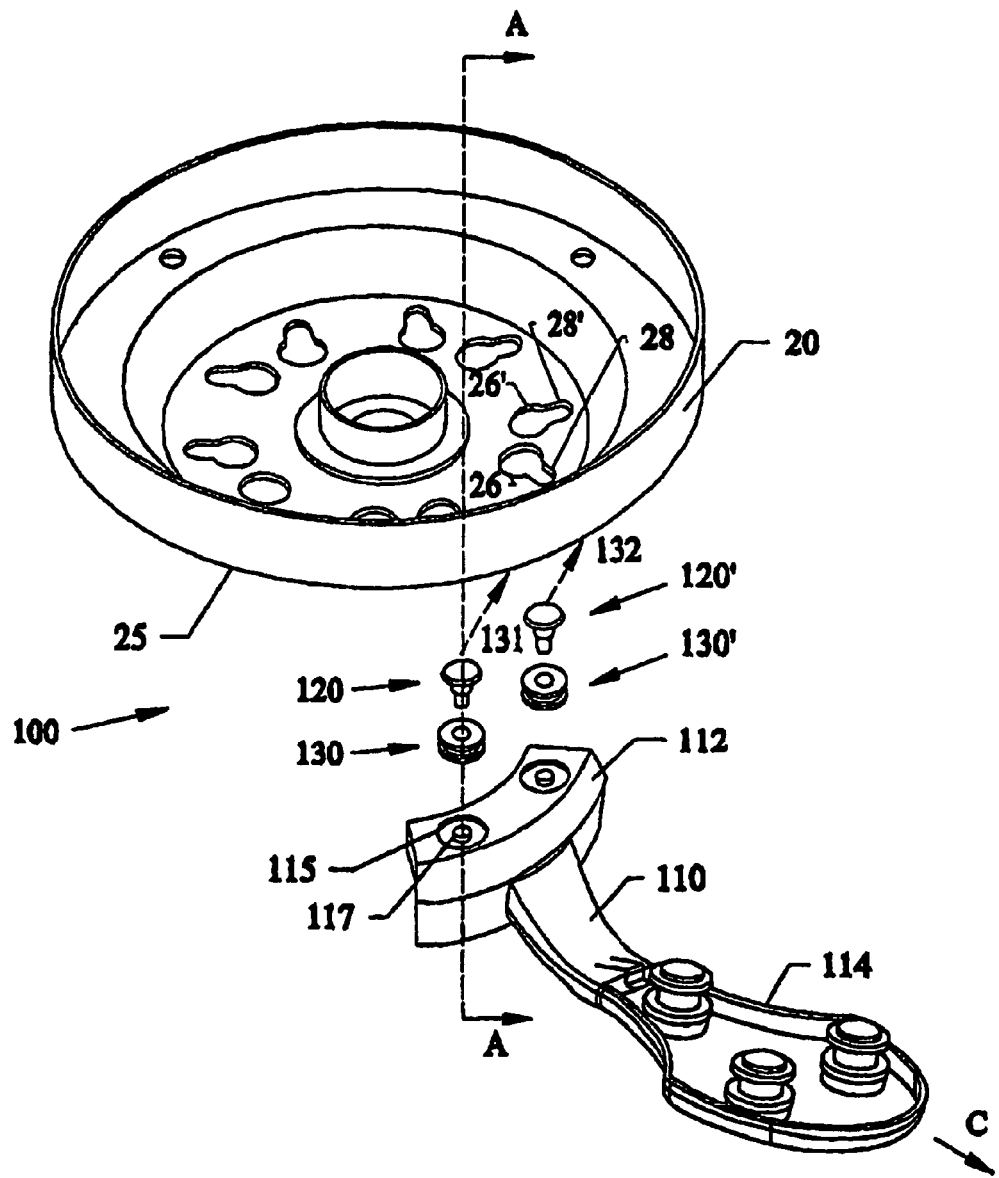
FIG. 2A is a perspective exploded view of a first embodiment of the slip and lock fasteners, novel grommet washer, mounting arm, and rotor used for the subject invention.

FIG. 2A is a perspective exploded view of a first embodiment 100 of the slip and lock fasteners 120, 120', grommets 130, 130', mounting arm 110, and rotor 20, 25 used for the subject invention. FIG. 2B is a side cross-sectional view of an assembled slide and lock fastener 120 and associated components of FIG. 2A along arrow A after being assembled and attached. FIG. 2C is an enlarged view of the slide and lock fastener of FIG. 2B with the protruding member 120 on the blade arm 110 and the slot 115 on the rotor 120, 125. FIG. 2D is a view of the flat-headed fastener screw 120 of FIG. 2C.

Referring to FIGS. 2A-2C, a mounting arm 110 has one end 114 connected to blade arms (not shown). End 114 can be connected to blade arms similar to that shown in FIG. 1. Alternatively, mounting arm 110 can be connected to detachable slide and lock blade fasteners such as those described in U.S. Ser. No. 09/200,607 filed Nov. 30, 1998 now U.S. Pat. No. 6,171,059, and U.S. application Ser. No. 08/851,501 filed on May 5, 1997 now U.S. Pat. No. 6,010,306, both by the same assignees as that of the subject invention, which are both incorporated by reference. End 112 of blade arm 110 has dual through-holes 115. Each through-hole 115, 115' has a circular indentation on the top surface 117, of the arm 110 for allowing a lower lip portion 132 of a rubber type gasket 130 to be located therein. Through-holes 115, 115' can have a threaded interior wall for receiving the threaded shaft 125 of flat headed screw fastener 120. The upper surface 123 of the flat portion 122 of fastener 120 can have be formed with a regular head. Phillips head, and the like surface, to allow the fastener 120 to be screwed into mounting arm end 112. The bottom 129 of fastener 120 can have a Phillips head or regular head screw surface to allow a user to remove the fastener 120 once the ceiling fan embodiment 100 has been installed. Deformable means 130 can be a single rubber gasket having a cylindrical lower lip portion 132, a cylindrical mid-portion 134, and an upper cylindrical lip portion 136, which can be used as a vibration isolator between the ceiling fan rotor 20 and the mounting arm 110. The mid-portion 134 of gasket 130 is fit within through-holes 115, 115' with upper lip portion sandwiched between the flat head 122 of fastener 120 and the end shield 125. Although two gaskets 130 and 130' are shown, one gasket could be used where the gaskets are connected by a single connecting upper lip portion 136. Alternatively, only the lip portions 136 of the gaskets 130 can be used as washers for vibration isolation, and so forth. Once the protruding fasteners 120, 120' and their respective gaskets 130, 130' are attached to mounting arm end 112, the entire mounting arm 110 is raised and the flat heads 122 of the protruding fasteners are inserted upward in the direction of arrows B1 and B2 into the larger openings 26, 26' of the key-hole slots and the mounting arm 110 is pulled outward in the direction of arrow C until the heads 122 of fasteners 120, 120' and upper lip portions 136 of gaskets 130, 130' slide into smaller key-hole slot openings 28, 28' where the tight fit of the exterior of mid-portions 134 of gaskets 130, 130' locks the mounting arms in place. An optional spring clip 140 similar to that described in U.S. Ser. No. 09/200,607 filed Nov. 30, 1998 now U.S. Pat. No. 6,171,059, and U.S. application Ser. No. 08/851,501 filed May 5, 1997 now U.S. Pat. No. 6,010,306, both by the same assignees as that of the subject invention, which are both incorporated by reference, can be used to further lock the mounting arms 110 in place on the endshield bottom 25 of rotor 20. Although two protruding fasteners and two slots are shown for each mounting arm, the invention can be practiced with one protruding fastener and slot, and three or more protruding fasteners and slots.

FIG. 2E is an enlarged view of the slide and lock fastener of FIG. 2C with the protruding member fastener 150 initially attached to the rotor end shield 125 and the through hole 115 on the mounting arm end 112. The mounting arm 110 can then be attached similar to that previously described above.

Second Embodiment

FIG. 3A is an exploded view of a second embodiment 200 of a quick install snapable mounting arm 210 for attaching to the rotor 20, 25 of a ceiling fan. FIG. 3B is a side cross-sectional view of the mounting arm 210 and rotor 20, 25 of FIG. 3A being attached together in the direction along arrow D. FIG. 3C is an enlarged view of the inwardly deformable snap fastener 220 and rotor 20, 25 of FIG. 3B. FIG. 3D is an enlarged view of the inwardly deformable snap fastener 220 of FIG. 3C.

Figure 1:
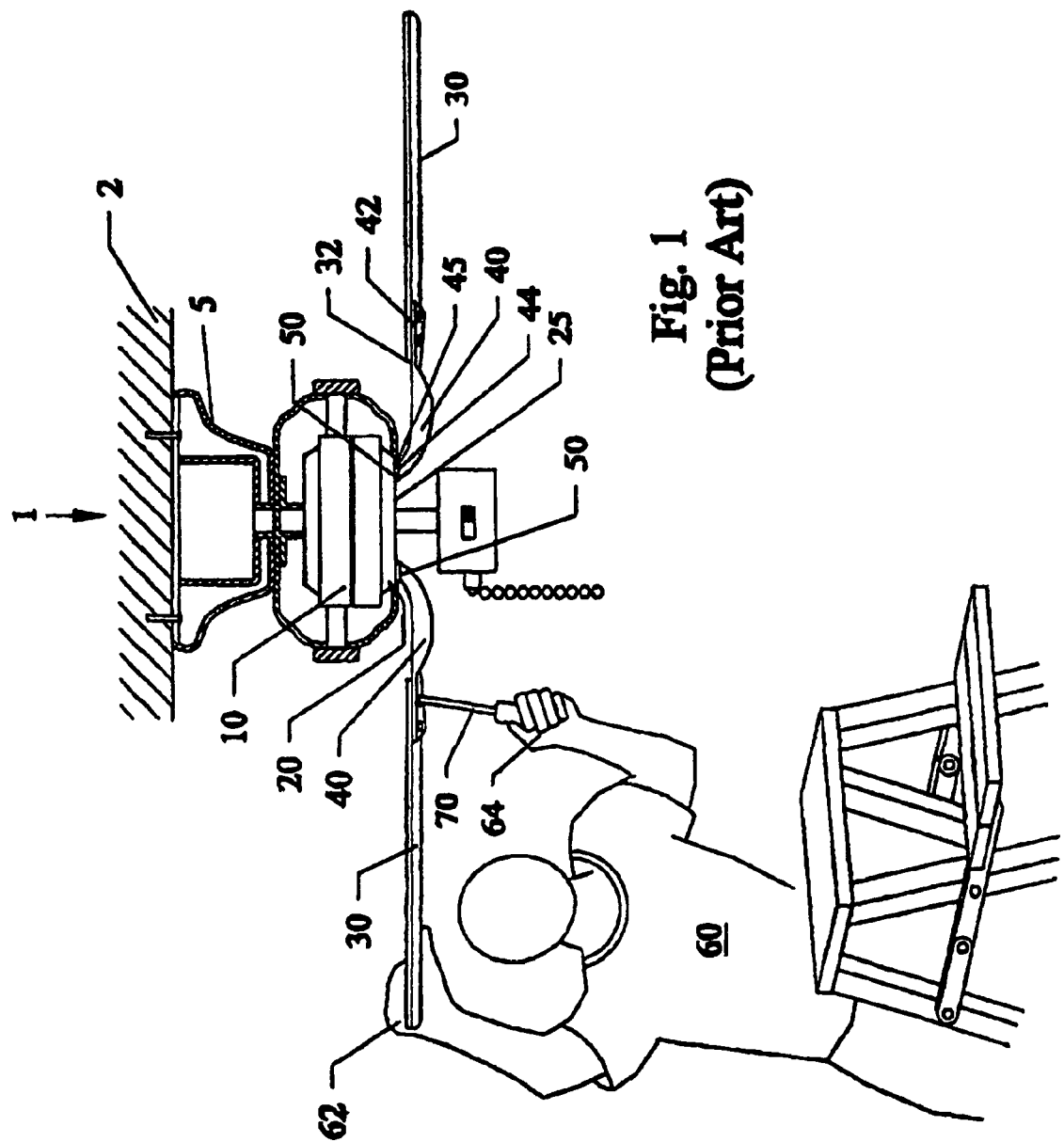
FIG. 1 shows a prior art view of a blade with mounting arm attached to a ceiling fan motor and rotor.

Referring to FIGS. 3A-3D, mounting arm 210 can have one end 214 connected to ceiling fan blades similar to that shown in FIG. 1. Alternatively, blade connection end 214 can be attached to detachable slide and lock blade fasteners such as those described in U.S. Ser. No. 09/200,607 filed Nov. 30, 1998 now U.S. Pat. No. 6,171,059, and U.S. application Ser. No. 08/851,501 filed on May 5, 1997 now U.S. Pat. No. 6,010,306, both by the same assignees as that of the subject invention, which are both incorporated by reference.

Mounting arm end 212 can include two upwardly projecting inwardly deformable fasteners 220, 220'. Each of the fasteners 220, 220' can have two identical sides separated by a continuous space 220 therebetween. For example, fastener 220 can have two upwardly projecting narrow base shafts 222, 223, two side extending hook edges 224, 225 and two narrowing sloped tip portions 226, 227. Protruding fasteners 220, 220' can be raised upward in the direction of arrows E1, E2 through circular slot openings 205, 205' so that tip portions 226, 227 inwardly bend in the direction of arrow F towards one another, followed by hook edges 224, 225 expanding outward about raised lips 206 of opening 205.

Although two fasteners 220, 220' are shown, the invention can include three or more protruding fasteners. Also, similar to the previous embodiment, the fasteners can likewise be located on the bottom of the endshield 25 of rotor 20, with the slot openings on the end 212 of the mounting arm 210. The fasteners and the endshield/rotor, and/or the fasteners and the mounting arm can be made from the same materials such as but not limited to injection molded plastic, and the like.

Third Embodiment

Figure 4A:
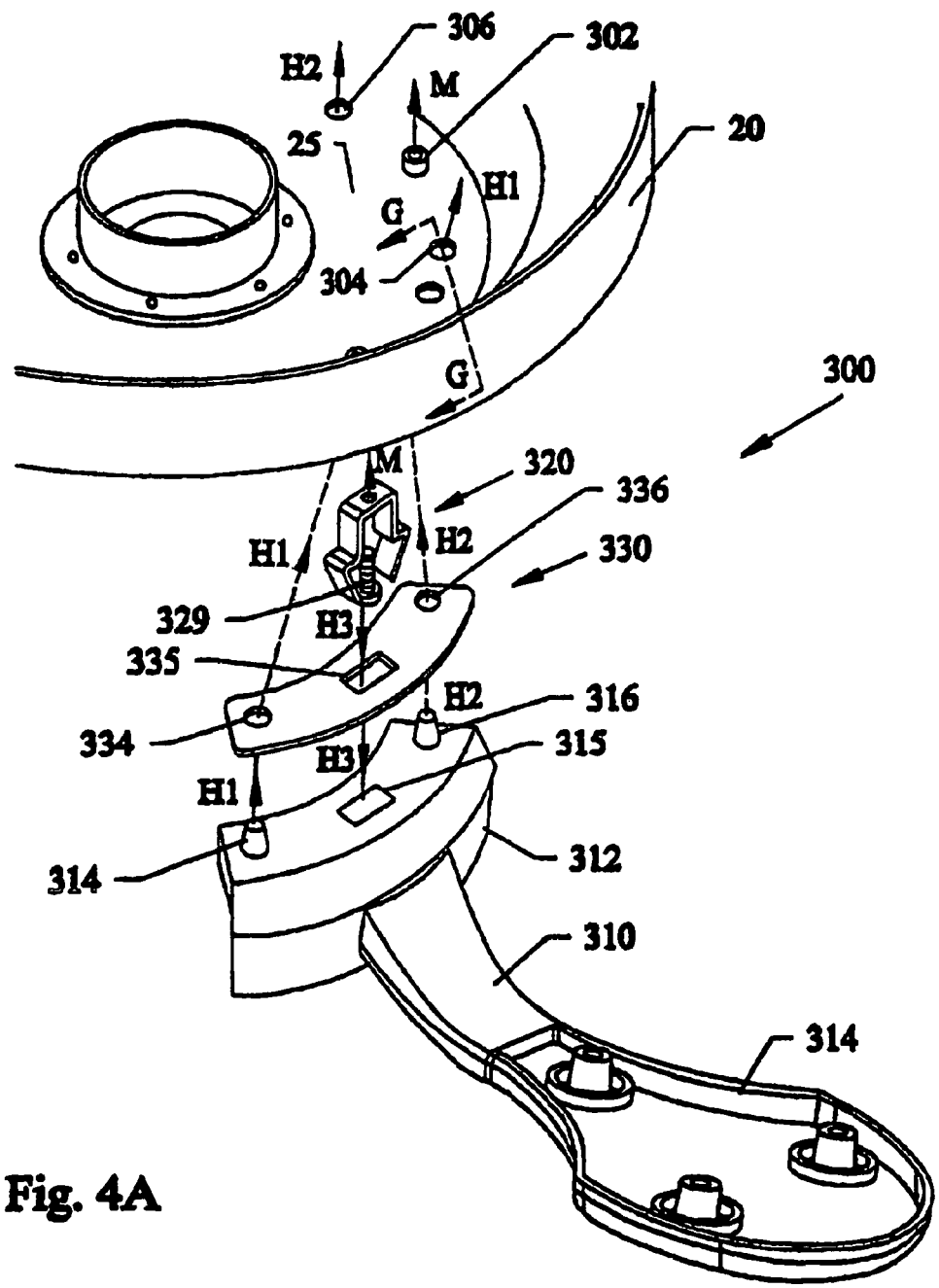
FIG. 4A is an exploded view of the third embodiment of a removable quick install snap fastener on the rotor of a ceiling fan that attaches to a mounting arm and deformable gasket therebetween.
Figure 4C:
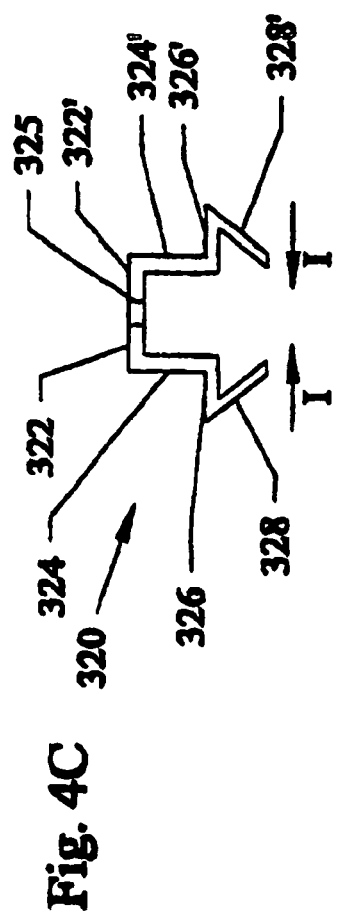
FIG. 4C is a side view of the snap fastener of FIG. 4B.
Figure 4B:
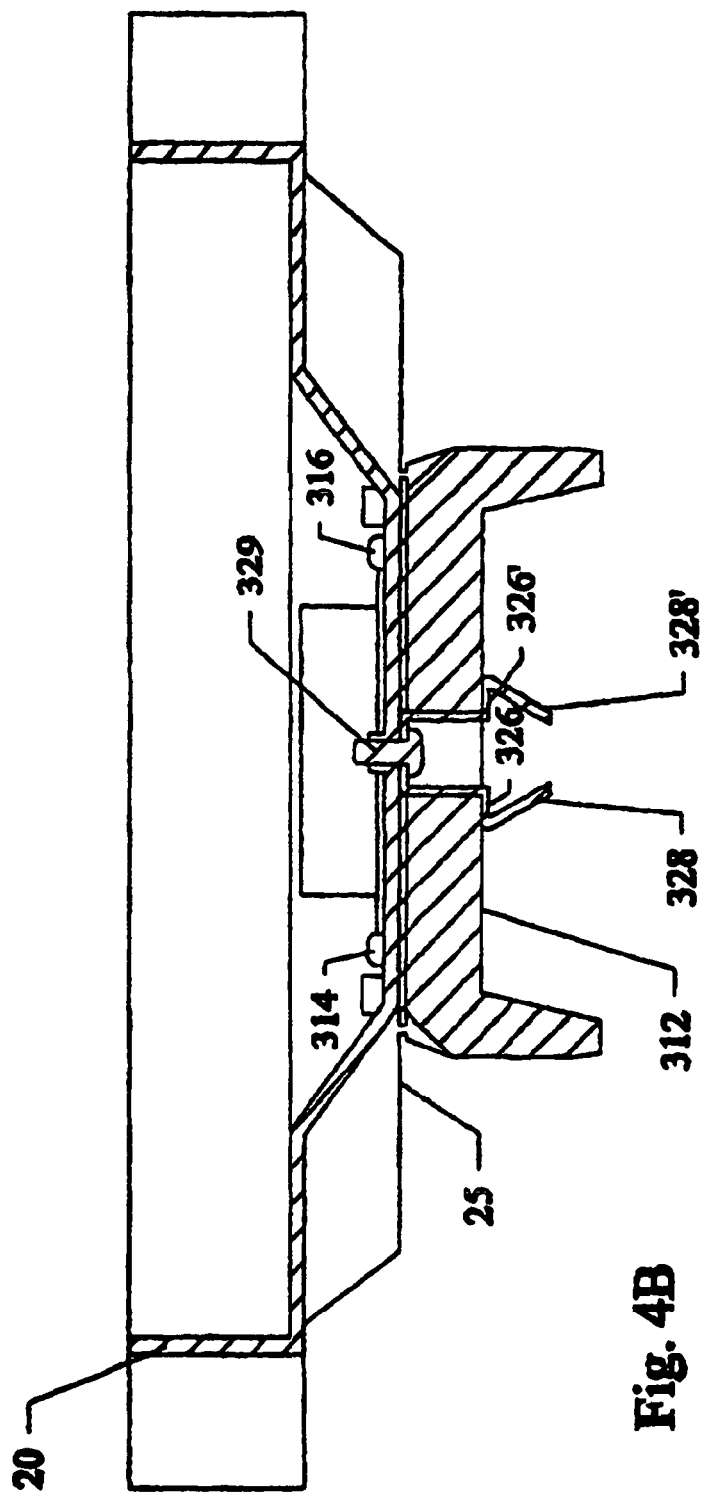
FIG. 4B is a side cross-sectional view of the mounting arm and rotor of FIG. 4A being attached together along arrow G.

FIG. 4A is an exploded view of the third embodiment 300 of a removable quick install snap fastener 320 on the rotor 20, 25 of a ceiling fan that attaches to a mounting arm 310 and deformable gasket 330 therebetween. FIG. 4B is a side cross-sectional view of the mounting arm 310 and rotor 20, 25 of FIG. 4A being attached together along arrow G. FIG. 4C is a side view of the snap fastener of FIG. 4B.

Referring to FIGS. 4A-4C, mounting arm 310 has an end 314 that connects to ceiling fan blades similar to that shown in FIG. 1. Alternatively, blade connection end 314 can be attached to detachable slide and lock blade fasteners such as those described in U.S. Ser. No. 09/200,607 filed Nov. 30, 1998 now U.S. Pat. No. 6,171,059, and U.S. application Ser. No. 08/851,501 filed on May 5, 1997 now U.S. Pat. No. 6,010,306, both by the same assignees as that of the subject invention, which are both incorporated by reference. End 312 has a centrally located rectangular through-hole slot 315 and two upwardly projecting guide posts 314, 316 each having sloping sides with a narrower tip to a widening base. A rubber type gasket washer 330 can have openings for the guide posts 334, 336, and an opening 335 of the snap fastener 320, with the washer 330 being located between the snap fastener 320 and the mounting arm end 312 for allowing vibration isolation therebetween. The snap fastener 320 includes a flat base 322, 322' having a through-hole 325 therebetween. A first prong has a vertical portion 324 parallel to the second prong's vertical portion 324', dual oppositely extending hook ledges 326, 326' and inwardly bending tip ends 328, 328'. A screw type fastener 329 having a regular or Philips head screws through hole 325 to connect fastener 320 to interior threaded opening 302 in endshield 25 of rotor 20. Next gasket 330 can be positioned about guide posts 314, 316 on mounting arm end 312. Next mounting arm 310 can be raised upward so that guide posts 314, 316 can be inserted in the direction of arrows H1 and H2 to pass through openings 304 and 306 in the bottom of endshield 25 or rotor 20. Simultaneously prong tip ends 328, 328' pass in the direction of arrow H3 into slot 315 and inwardly bend toward one another in the direction of arrow I, until hook ledges 326 pass though and abut against the lower surface of mounting arm 312. After being fully assembled, a user can merely take a screw driver to the head of fastener 329 to remove the mounting arm 310 from the ceiling fan.

Figure 4D:
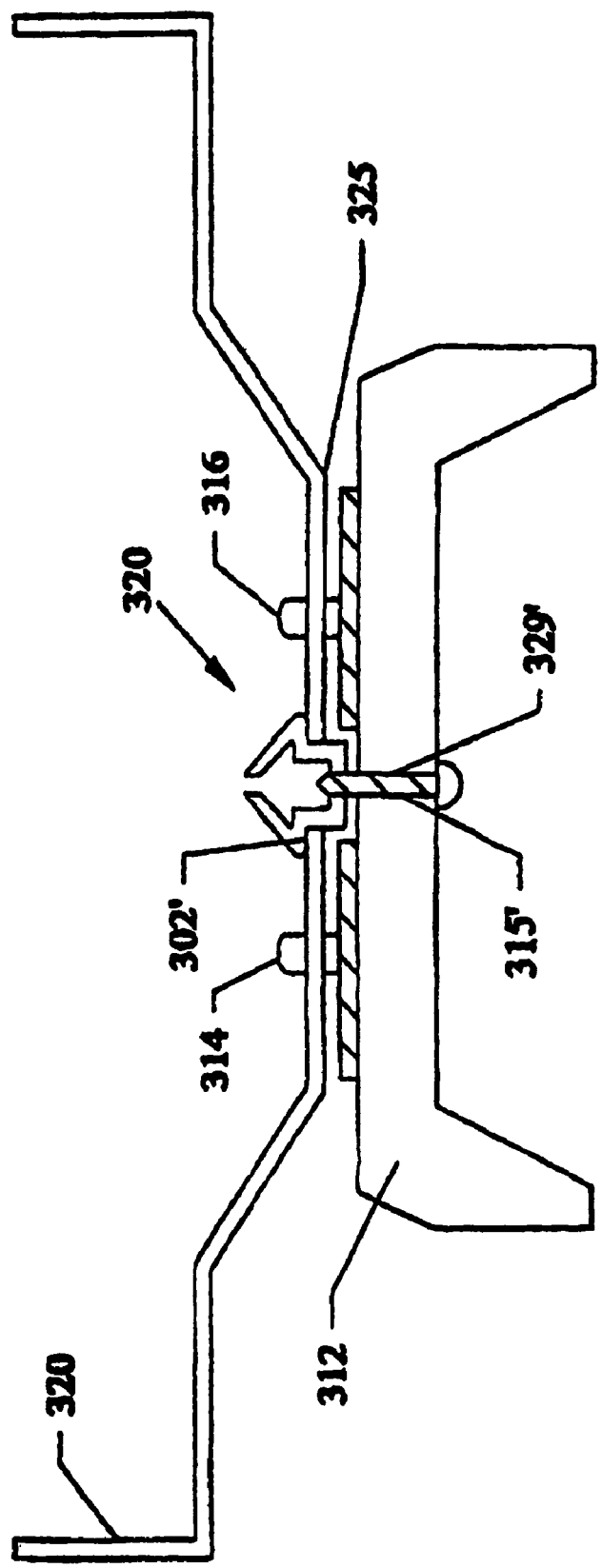
FIG. 4D is a side cross-sectional view of FIG. 4B with the removable snap fastener initially attached to the mounting arm.

FIG. 4D is a side cross-sectional view of FIG. 4B with the removable snap fastener 320 initially attached to the mounting arm 312. In FIG. 4D, through-hole 315' in mounting arm end 312 is large enough to receive the shaft of a long screw type fastener 329', and prongs 328, 328' of fastener 320 pass through an enlarged slot opening 302' in the bottom of endshield 325. Similar to FIGS. 4A-4C, mounting arm 310 can be raised until prong ends of fastener 320 pass into and hook within slot opening 302' in the ceiling fan mounting endshield 25.

While both the second and third embodiments show each snap fastener as having two halves which can bend toward one another, the invention can be practiced with only one hook end that is bendable.

Although the embodiments show and describe mounting arms separate from the ceiling fan blades, the invention can be practiced where the mounting arm and ceiling fan blades are one and the same. For example single combined mounting arm and ceiling fan blade made from injection molded plastic and the like.

While only the third embodiment is shown using alignment guide poles, both the first embodiment and the second embodiment can include alignment guide poles so that only one fastener needs to be used. Additionally, guide posts can be downwardly extending from the bottom of the endshield for being inserted into mateable openings in the mounting arm.

While the invention has been described, disclosed, illustrated and shown in various terms of certain embodiments or modifications which it has presumed in practice, the scope of the invention is not intended to be, nor should is be deemed to be, limited thereby and such other modifications or embodiments as may be suggested by the teachings herein are particularly reserved especially as they fall within the breadth and scope of the claims here appended.

We claim:

1. A method of assembling a ceiling fan, comprising the steps of:
   providing a ceiling fan motor with a rotating member;
   providing a plurality of mounting arms, each mounting arm having an interior end adapted to be attached to the ceiling fan motor and an exterior end extending away from the ceiling fan motor;
   providing a plurality of bendable fasteners that are each located between each interior end of the mounting arm and the rotating member of the ceiling fan motor;
   providing a plurality of ceiling fan blades, each ceiling fan blade having a connecting end and an exterior end, each respective connecting end of the ceiling fan blades being attached to respective exterior ends of each respective mounting arm; and
   snapably attaching each interior end of the mounting arm with the rotating member of the ceiling fan motor by the bendable fasteners, by:
   inwardly bending tip ends of the bendable fastener into an opening; and
   hooking edges of the bendable fastener to the opening.

2. The method of claim 1, further comprising the steps of:
   providing a plurality of rotatable threaded fasteners, each being used to attach the bendable fasteners to either the rotating member or the interior end of each mounting arm; and
   releasing the mounting arms from the rotating member by unscrewing the rotatable threaded fasteners.

3. The method of claim 1, further comprising the step of:
   providing a plurality of gaskets that are each located between each interior end of the mounting arm and the rotating member of the ceiling fan motor.

4. A ceiling fan comprising:
   a motor having a rotatable member;
   a plurality of mounting arms, each mounting arm having an interior end adapted to be attached to the ceiling fan motor and an exterior end extending away from the ceiling fan motor;
   a plurality of bendable fasteners that are each located between each interior end of the mounting arm and the rotating member of the ceiling fan motor, each of the bendable fasteners having a pair of upwardly protruding and inwardly bending tip ends and hook edges, each respective pair of tip ends and hook edges snaps into an opening; and
   a plurality of ceiling fan blades, each with a connecting end and an exterior end, each respective connecting end of the ceiling fan blades being attached to respective exterior ends of each respective mounting arm, wherein the mounting arms are attached to the ceiling fan motor by inwardly bending the upwardly protruding and inwardly bending tip ends and hook edges of the inwardly bendable fasteners into each opening and hooking the hook edges of the bendable fasteners to each opening.

5. The ceiling fan of claim 4, further comprising:
   a plurality of rotatable threaded fasteners, each being used to attach the bendable fasteners to either the rotating member or the interior end of each mounting arm, wherein releasing the mounting arms from the rotating member occurs by unscrewing the rotatable threaded fasteners.

6. The ceiling fan of claim 4, further comprising:
   a plurality of gaskets that are each located between each interior end of the mounting arm and the rotating member of the ceiling fan motor.

\* \* \* \* \*